United States Patent [19]

Plumet

[11] 4,233,081
[45] Nov. 11, 1980

[54] PROCESS FOR DISPERSING FINELY DIVIDED PARTICLES IN AN AQUEOUS MEDIUM

[75] Inventor: Lucien Plumet, Vilvoorde, Belgium

[73] Assignee: Solvay & Cie., Brussels, Belgium

[21] Appl. No.: 657,101

[22] Filed: Feb. 11, 1976

[30] Foreign Application Priority Data

Feb. 17, 1975 [LU] Luxembourg ............... 71867

[51] Int. Cl.³ ............... C09D 3/20; C09D 3/36; C09D 5/02; C08L 33/08
[52] U.S. Cl. ............... 106/214; 106/308 B; 106/308 Q; 106/213; 260/17.4 ST; 260/29.2 EP; 260/29.6 RW; 260/29.6 R; 526/292
[58] Field of Search ............... 106/213, 214, 308 Q; 526/292, 240

[56] References Cited

U.S. PATENT DOCUMENTS

| | | | |
|---|---|---|---|
| 3,501,424 | 3/1970 | Imoto | 106/214 |
| 3,890,288 | 6/1975 | Vogt et al. | 526/292 |
| 3,890,291 | 6/1975 | Vogt et al. | 526/292 |

*Primary Examiner*—Theodore Morris
*Attorney, Agent, or Firm*—Spencer & Kaye

[57] ABSTRACT

A process is provided for dispersing finely divided water-insoluble particles in an aqueous medium. The dispersing agent used comprises a salt of a polymer derived from an alpha-hydroxyacrylic acid, which salt contains units of the formula

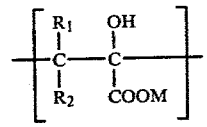

wherein $R_1$ and $R_2$ independently represent hydrogen or an alkyl group containing 1 to 3 carbon atoms and wherein M represents a cationic radical resulting from the dissociation of a base.

30 Claims, No Drawings

PROCESS FOR DISPERSING FINELY DIVIDED PARTICLES IN AN AQUEOUS MEDIUM

BACKGROUND OF THE INVENTION

The present invention relates to a new process for stably dispersing finely divided and water-insoluble organic or inorganic particles in an aqueous medium by means of a dispersing agent. The present invention also relates to the dispersions obtained in accordance with this process and especially painting compositions comprising an aqueous vehicle, compositions for coating or surfacing of paper, and adhesive compositions.

It is known to stabilize aqueous dispersions of solid particles by means of synthetic polymeric dispersing agents. Water-soluble salts of carboxylic polyacids, such as ammonium polyacrylate, are particularly used for this purpose. These known polymeric dispersing agents are very effective in stabilizing the dispersions. However, they suffer from a disadvantage, namely, that they impart a high viscosity to the aqueous phase. As a result, the use of aqueous dispersions which can be obtained with these dispersing agents is more difficult than that of aqueous dispersions where other types of dispersing agents are employed.

SUMMARY OF THE INVENTION

It has now been found, in accordance with the present invention, that a particular type of polyacrylate can be used as the dispersing agent with the same advantages as the polyacrylates used in the prior art, without exhibiting the disadvantage of giving excessively viscous aqueous phases.

The present invention, as embodied and broadly described, provides a process for dispersing finely divided water-insoluble particles in an aqueous medium, in which the dispersing agent used comprises a salt of a polymer derived from an alpha-hydroxyacrylic acid, which salt contains units of the formula

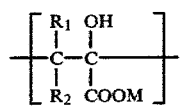

I.

wherein $R_1$ and $R_2$ independently represent hydrogen or an alkyl group containing 1 to 3 carbon atoms and wherein M represents a cationic radical resulting from the dissociation of a base.

DETAILED DESCRIPTION OF THE INVENTION

The polymer salts used according to the present invention are preferably the polymers defined above, in which $R_1$ and $R_2$ represent hydrogen or a methyl group, and $R_1$ and $R_2$ can be identical or different. The best results are obtained with polymers wherein $R_1$ and $R_2$ represent hydrogen.

The polymers used in the present invention are selected from the group consisting of the homopolymers and copolymers containing units as defined in formula I above, these units being of the same type or of several different types. If copolymers are used, they are chosen from among those which contain at least 50% of units as defined in formula I above, and preferably, from among those which contain at least 65% of similar units. The best results are obtained with polymers which only contain units as defined in formula I above.

The average molecular weight of polymers employed in the practice of the present invention is greater than about 300. In general, it is between 1,000 and 1,000,000. Preferably, it is between 2,000 and 100,000. The best results are obtained if it is between about 5,000 and about 10,000.

The copolymers which can be used include those containing units derived from vinyl monomers substituted by one or more groups selected from the group consisting of hydroxyl and carboxyl groups. Advantageously, these copolymers contain acrylic units of the formula

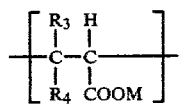

II.

wherein $R_3$ and $R_4$ independently represent a hydrogen atom or an alkyl group containing 1 to 3 carbon atoms and wherein M represents the cationic radical resulting from the dissociation of a base and has the same meaning as in formula I above. Among these copolymers, it is preferred to use those containing acrylic units derived from unsubstituted acrylic acid, wherein $R_3$ and $R_4$ represent hydrogen.

The polymers used according to the present invention are salts derived from any organic or inorganic base. It is advantageous to use the salts of inorganic bases, such as the hydroxides of alkali metals or ammonium hydroxide. It is also possible to use the salts of nitrogen-containing organic bases of the aliphatic type, containing a nitrogen atom substituted by one or more alkyl chains which contain 1 to 6 carbon atoms and which can be substituted. Examples of such bases are monoethanolamine or diethanolamine. It is also possible to use salts of nitrogen-containing organic bases of an alicyclic or aromatic type, which may or may not contain the nitrogen atom in the ring. The salts of alkali metal hydroxides and of ammonium hydroxide are particularly suitable. The best results are obtained with the sodium salts and ammonium salts.

A particularly suitable polymer is, accordingly, sodium poly-alpha-hydroxyacrylate.

The polymers used according to the present invention can be prepared by any known process. An example of the preparation of these polymers is described in Belgian Pat. No. 817,678, filed on July 15, 1974, in the name of Solvay & Cie., which is hereby incorporated by reference.

The amount of polymer used as dispersing agent in accordance with the process of the present invention is generally between 0.01 to 10% by weight of polymer relative to the weight of solid particles to be dispersed, and is most frequently between 0.1 and 5%. The optimum amount to employ in each case depends particularly on the nature and the morphology of the particles to be dispersed. It can be easily be determined experimentally.

The polymers employed as dispersing agents in accordance with the process which forms the subject of the present invention can optionally be used as a mixture with other, known dispersing agents.

The solid particles which can be dispersed in accordance with the process of the present invention comprise any organic or inorganic material which is practically insoluble or very slightly soluble in water. In general, the solubility of the material at 20° C. is less than 10 g/l of water. The mean dimensions of these particles are generally less than 1 mm, most frequently less than 250μ, and are preferably between 0.1 and 100μ. These materials are organic or inorganic powders used in the manufacture of various products, such as, for example, liquors for coating paper, paints, pigments, dyestuffs, adhesives, medicaments, foodstuffs, agricultural chemical products and construction materials. As examples of particles which can be dispersed in accordance with the invention, there may be mentioned titanium dioxide, chalk, kaolin, calcium carbonate, zinc carbonate, barium sulfate, silicic acid, satin white, white lead, talc, gypsum, zinc oxide, calcium magnesium carbonate, pearl white, helios white, antimony white, silver powder, gold powder, purple, indigo, ochre, red lead, iron oxide, synthetic organic pigments, wheat flour, starch powders, cement and polymers which are insoluble or sparingly soluble in water, such as polyethylene, polyvinyl chloride, vinyl acetate copolymers, elastomers and epoxide resins.

The process which forms the subject of the present invention is very particularly applicable to the dispersion of organic or inorganic pigments and of fillers.

The aqueous medium in which the particles are dispersed can optionally contain less than 30%, and preferably, less than 10%, of another liquid which is completely miscible with water in the proportions used and at the temperatures used. As liquids which can be added to the water, there may be mentioned monohydric or polyhydric alcohols.

The dispersions are usually prepared at temperatures of between 0° to 100° C., and most frequently, at temperatures of between 15° and 80° C.

Usually, the dispersing agent is first of all dissolved in the aqueous medium intended for the preparation of the dispersion of solid particles. Thereafter, the solid particles which are to be dispersed are distributed in the solution thus obtained.

This distribution can be effected by mechanical means, such as stirring or the use of ultrasonics. It is also possible to form the solid particles which are to be dispersed directly in the aqueous solution of the dispersing agent, either by a chemical reaction or by physical means, such as, for example, precipitation from a solution.

In general, the process chosen to produce the dispersion comprises introducing the solid particles which are to be dispersed into the aqueous solution of the dispersing agent with vigorous stirring. In that case, the means of stirring are most frequently rotary means of stirring, revolving at about 100 to 20,000 revolutions per minute.

The pH of the aqueous solutions of the dispersing agent used in the invention is generally above 5 and, most frequently, above 6.

The present invention also relates to the aqueous dispersions obtained by means of the polymers derived from poly-alpha-hydroxy-acrylates, as well as to the compositions of matter based on such dispersions. Such compositions can contain, in addition to the aqueous phase, the dispersing agent and the solid particles which are to be dispersed, various other additives which depend on the usage of the compositions, such as, for example, dispersion adjuvants, binders, viscosity regulators, foam regulators, plasticizers, preservatives, emulsifiers, pH regulators and the like.

The aqueous dispersions obtained according to the present invention can advantageously be used for the preparation of water-based paints. Such water-based paint compositions can contain, in addition to the dispersing agent, the pigments and, if appropriate, the fillers, and the aqueous phase, other additives, such as binders, plasticizers, stabilizers, thickeners, fungicidal agents, coalescence solvents, anti-gelling agents, pH regulators and foam regulators.

One of the pigments most frequently used at the present time in white paints is titanium dioxide. Colored pigments used are especially black pigments derived from carbon, black iron oxide, red lead, chromates, Venetian red, Prussian blue, chromium oxide, chromium green, cobalt blue and organic pigments, such as, for example, the derivatives of benzidine, triphenylmethane, β-hydroxynaphthoic acid and β-naphthol.

The fillers most frequently used in such water-based paints are, for example, barium sulfate, calcium sulfate, calcium carbonate, magnesium carbonate, the double carbonate of magnesium and calcium, silica, magnesium silicate, talc and kaolin.

The binders used in such water-based paints can be natural products, such as, for example, casein, cellulose derivatives, polyvinyl alcohol, starch or its derivatives, or synthetic latices, such as homopolymers or copolymers derived from vinyl chloride, vinylidene chloride, styrene, acrylic compounds and vinyl alkanoates (acetates, propionates and the like). Among the copolymers defined here as binders, there are included graft copolymers and block copolymers.

The water-based paints, into which the dispersing agents of the invention are advantageously introduced, generally contain from 30 to 70% by weight of solids, comprising 5 to 90%, and preferably, 5 to 60%, by weight of pigments, 5 to 9%, and preferably, 5 to 60%, by weight of binder and 0 to 10% of various additives, relative to the total weight of the solids, the amounts depending on the envisaged use.

The aqueous dispersions obtained according to the process of the present invention can also be used for the preparation of compositions for coating or surfacing of paper or of paper substitutes.

Such coating and surfacing compositions contain, in addition to the pigment, the aqueous phase (which can optionally contain small amounts of other solvents, such as, for example, alcohols), and the dispersing agent, various other auxiliaries for coating products, such as, in particular, viscosity regulators, optical bluing agents, wax dispersions, agents which affect the water resistance, and foam regulators.

The most frequently used pigment in such coating and surfacing compositions is kaolin, optionally mixed with small amounts of other pigments, such as chalk, titanium dioxide or yet others. Most frequently, the pigments used for coating paper contain about 100 to 80% of kaolin, the remainder consisting of another pigment.

Various binders can be used in such coating or surfacing compositions. The most common are starch, which may be modified, or synthetic latices based on homopolymers or copolymers derived from acrylic compounds or from styrene-butadiene, these copolymers including graft copolymers and block copolymers.

In the compositions for coating paper, the solids content is generally about 30 and 70% by weight.

The aqueous dispersions obtained according to the process of the invention can also be used in adhesive compositions and, in particular, in ready-to-use adhesive compositions which are in the form of pastes based on aqueous emulsions. In this case, the adhesive compositions contain, in addition to the dispersing agent, the aqueous phase, the inorganic fillers and the binders, additives such as, in particular, thickeners, water retention agents, plasticizers, stabilizers, perservatives, antiform agents and anti-slip agents.

The binders most frequently used in the adhesive compositions are synthetic latices containing copolymers or copolymers derived from acrylic compounds, from butadiene-styrene, from vinyl alkanoates (acetate, propionate and the like) and, at times, vinyl chloride and vinylidene chloride.

As inorganic fillers in the adhesive compositions, it is possible to use a great variety of fillers, such as, for example, zinc oxide, kaolin, sand, gypsum, silica, silicates, aluminates and aluminosilicates.

Cellulose derivatives, such as alkylcellulose and alkoxycellulose, are frequently used as thickners and water retention agents in such adhesive compositions. Other thickners can also be used.

Such adhesive compositions usually contain from 30 to 80% by weight of total solids and from 20 to 60% by weight of inorganic fillers relative to the total weight of the composition The polymers used as dispersing agents according to the present invention have proved very efficient especially for dispersing pigments and fillers. The dispersions obtained are very stable. Furthermore, these polymers have the advantage that they do not upset the natural equilibrium of waters if they are discharged into surface waters.

Furthermore, when these dispersions are in adhesive compositions, an improvement in the water retention is observed, which results in longer workability and superior performance when the adhesive is used as a thin layer.

The examples which follow demonstrate the remarkable properties of the dispersing agents which form the subject of the present invention, without, however, limiting the invention.

EXAMPLES 1R to 5

Five experiments were carried out with different dispersing agents and are reported herein as Examples 1R to 5. The examples below show the dispersing properties of the products, which form the subject of the present invention, in painting compositions. Example 1R was carried out by way of comparison with ammonium polyacrylate of a low degree of polymerization as a pigment dispersing agent. This ammonium polyacrylate was obtained from B.A.S.F. and is referred to herein as agent A. Examples 2, 3, 4 and 5 were carried out in accordance with the present invention, with the aid of sodium poly-alpha-hydroxyacrylates of different average molecular weights as the pigment dispersing agent. These dispersing agents are referred to herein as agents B, C, D and E in Examples 2 to 5, respectively.

The change, as a function of the content of dispersing agent, in the viscosity of dispersions of a pigment composition having a volume ratio of fillers:pigment equal to 3, was examined. The pigment composition had the following composition shown below:

| titanium dioxide KRONOS RN 56 | 134.7 g |
|---|---|
| dolomite DRB 20 | 165.8 g |
| calcium carbonate SOCAL P2 | 66.3 g |
| aluminum silicate AL P 820 | 33.2 g |

This viscosity measurement was carried out with a BROOKFIELD viscometer (model RVT, equipped with 7 measuring bodies) at 22° C., body 2 being subjected to speeds of 20 revolutions per minute.

Each experiment consisted of converting 400 g of pigment composition to a paste by means of 200 g of water. Thereafter, small amounts of aqueous solutions of the dispersing agent, respectively, containing 29% by weight (Example 1R), 8% by weight (Example 2) and 10% by weight (Examples 3, 4 and 5) of dispersing agent, are added, and after each addition, the viscosity of the dispersion is examined. The diagram of viscosity against content of dispersing agent, thus obtained, shows a minimum which corresponds to the optimum dose of dispersing agent to be employed for the pigment composition studied. Table I below records, for each experiment, this optimum dose of dispersing agent, as well as the corresponding "BROOKFIELD" viscosities expressed in centipoises.

Series of experiments carried out at speeds of rotation of the body No. 2 of 5, 10, 50 and 100 revolutions per minute gave virtually identical results as regards the optimum dose of dispersing agent and as regards the corresponding viscosities.

Table I also shows the values of the intrinsic viscosities (Flory, PRINCIPLES OF POLYMER CHEMISTRY, Cornell University Press, pages 309 and 310) of each of the dispersing agents at 25° C. The measurements which make it possible to calculate the intrinsic viscosity of the samples of sodium poly-alpha-hydroxyacrylate were carried out by means of an Ubbelohde viscometer, starting with aqueous solutions containing ½ mol of KCl per liter of solution and 6 g of polymer per liter, (for the polymers used in Examples 2, 4 and 5), the solutions subsequently being diluted with a ½ molar KCl solution. For the polymer used in Example 3 which has a molecular weight of about 8,000, the starting solution contains 10 g of polymer per liter. The intrinsic viscosity of the dispersing agent A was calculated from viscosity measurements carried out on the commercially-available solution.

TABLE I

| Example No. | 1R | 2 | 3 | 4 | 5 |
|---|---|---|---|---|---|
| Dispersing agent | A | B | C | D | E |
| Molecular weight of the dispersing agent | | 340,000 | ≈8,000 | 60,000 | 190,000 |
| Intrinsic viscosity [η] of the dispersing agent, 1/g | 0.026 | 0.154 | 0.006 | 0.026 | 0.115 |
| Optimum amount of dispersing agent required relative to the total amount of pigment + fillers, % | 0.21 | 0.55 | 0.26 | 0.47 | 0.55 |
| BROOKFIELD viscosity (body 2, speed 20), cps | 140 | 75 | 105 | 80 | 72 |

The results given in the preceding Table I show that the use of the sodium poly-alpha-hydroxyacrylate as a dispersing agent makes it possible to obtain lower viscosities (see Examples 2, 3, 4 and 5) than those obtained with a known dispersing agent, and to do so regardless of the molecular weight of the dispersing agent.

EXAMPLES 6R to 11

The examples given below show the dispersing properties of the products which form the subject of the present invention in paper-coating liquors.

Six experiments were carried out with four different dispersing agents and are reported herein as Examples 6R, 7R, 8, 9R, 10R and 11. Examples 6R, 7R, 9R and 10R were carried out by way of comparison. Example 6R was carried out with sodium tetra-pyrosphosphate (TPPS) as the dispersing agent and referred to herein as agent F. Examples 7R and 10R were carried out with POLYSALZ C.A., a sodium salt of a polycarboxylic acid, sold by B.A.S.F., as the dispersing agent and referred to herein as agent G. Example 9R was carried out with CALGON P.T.H., a polymetaphosphate sold by Hoechst, as the dispersing agent and referred to herein as agent I. Examples 8 and 11 were carried out, in accordance with the present invention, with a sodium poly-alpha-hydroxyacrylate (SPHA) of averge molecular weight of about 10,000 and referred to herein as agent H.

The change, as a function of the content of dispersing agent, in the viscosity of paper-coating liquors free from binders and containing two different fillers was examined. For Examples 6R, 7R and 8, the filler was SOCAL P2, a calcium carbonate sold by Giraud and for Examples 9R, 10R and 11, the filler was WENOLINE, a kaolin sold by Berrien.

This viscosity measurement was carried out by means of a BROOKFIELD viscometer (model RVT equipped with 7 measuring bodies) at 22° C., body 2 being subjected to speeds of 100 revolutions per minute.

Each experiment consisted of working 730 g of SOCAL P2 or 670 g of WENOLINE kaolin into a paste with, respectively, 270 or 330 g of water. Thereafter, small amounts of aqueous solutions of the dispersing agent, containing about 10% by weight of dispersing agent, are added, and after each addition, the viscosity of the dispersion is examined. The diagram of viscosity against content of dispersing agent, thus obtained, shows a minimum which corresponds to the optimum dose of dispersing agent to be employed for the coating liquor in question. Table II records, for each experiment, this optimum dose of dispersing agent, as well as the corresponding "BROOKFIELD" viscosities expressed in centipoises.

much lower viscosities (see Examples 8 and 11) for the same filler than those obtained with known agents.

It will be understood that the above description of the present invention is susceptible to various modifications, changes and adaptations, and the same are intended to be comprehended within the meaning and range of equivalents of the appended claims.

What is claimed is:

1. In a painting composition obtained by dispersing finely divided water-insoluble particles in an aqueous medium by using as dispersing agent a salt of a carboxylated polymer, the improvement wherein the dispersing agent used comprises a salt of a polymer derived from an alpha-hydroxyacrylic acid, which salt contains at least 50 mol % of units of the formula

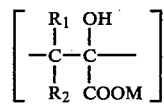

wherein $R_1$ and $R_2$ independently represent hydrogen or an alkyl group containing 1 to 3 carbon atoms and wherein M represents a cationic radical resulting from the dissociation of a base.

2. Painting composition according to claim 1, wherein the dispersing agent is a copolymer containing at least 65 mol % of units of the formula

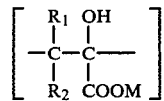

3. Painting composition according to claim 1, wherein the dispersing agent is a polymer which only contains units

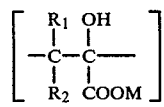

4. Painting composition according to claim 1, wherein the dispersing agent is an alkali metal salt or ammonium salt.

5. Painting composition according to claim 4,

TABLE II

| Example No. | 6R | 7R | 8 | 9R | 10R | 11 |
|---|---|---|---|---|---|---|
| Filler | WENOLINE kaolin | | | SOCAL P2 | | |
| Dispersing agent | TPPS | POLYSALZ | SPAH | CALGON | POLYSALZ | SPAH |
| Optimum amount of dispersing agent relative to the weight of the filler, % | 0.30 | 0.40 | 0.40 | 0.65 | 0.80 | 0.55 |
| BROOKFIELD viscosity, cps | 325 | 1,040 | 275 | 230 | 380 | 138 |
| pH of the solution | 6.5–7 | 6.3 | 6.2 | — | — | — |

The examination of the results presented in Table II shows that the use of sodium poly-alpha-hydroxyacrylate as a dispersing agent makes it possible to obtain wherein the dispersing agent is a sodium salt.

6. Painting composition according to claim 1, wherein $R_1$ represents a hydrogen atom and $R_2$ is selected from the group consisting of hydrogen and the methyl group.

7. Painting composition according to claim 6, wherein the dispersing agent is sodium poly-alpha-hydroxyacrylate.

8. Painting composition according to claim 1, wherein the amount of dispersing agent employed is between 0.01 and 10% by weight relative to the particles to be dispersed.

9. Painting composition according to claim 1, wherein the dispersing agent has an average molecular weight greater than 300.

10. Painting composition according to claim 9, wherein the dispersing agent has an average molecular weight of between 2,000 and 100,000.

11. In a composition for the coating of paper obtained by dispersing finely divided water-insoluble particles in an aqueous medium by using as dispersing agent a salt of a carboxylated polymer, the improvement wherein the dispersing agent used comprises a salt of a polymer derived from an alpha-hydroxyacrylic acid, which salt contains at least 50 mol % of units of the formula

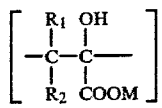

wherein $R_1$ and $R_2$ independently represent hydrogen or an alkyl group containing 1 to 3 carbon atoms and wherein M represents a cationic radical resulting from the dissociation of a base.

12. Composition for the coating of paper according to claim 11, wherein the dispersing agent is a copolymer containing at least 65 mol % of units of the formula

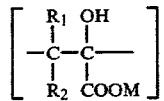

13. Composition for the coating of paper according to claim 11, wherein the dispersing agent is a polymer which only contains units

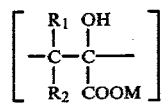

14. Composition for the coating of paper according to claim 11, wherein the dispersing agent is an alkali metal salt or ammonium salt.

15. Composition for the coating of paper according to claim 14, wherein the dispersing agent is a sodium salt.

16. Composition for the coating of paper according to claim 11, wherein $R_1$ represents a hydrogen atom and $R_2$ is selected from the group consisting of hydrogen and the methyl group.

17. Composition for the coating of paper according to claim 16, wherein the dispersing agent is sodium poly-alpha-hydroxyacrylate.

18. Composition for the coating of paper according to claim 11, wherein the amount of dispersing agent employed is between 0.01 and 10% by weight relative to the particles to be dispersed.

19. Composition for the coating of paper according to claim 11, wherein the dispersing agent has an average molecular weight greater than 300.

20. Composition for the coating of paper according to claim 19, wherein the dispersing agent has an average molecular weight of between 2,000 and 100,000.

21. In an adhesive composition obtained by dispersing finely divided water-insoluble particles in an aqueous medium by using as dispersing agent a salt of a carboxylated polymer, the improvement wherein the dispersing agent used comprises a salt of a polymer derived from an alpha-hydroxyacrylic acid, which salt contains at least 50 mol% of units of the formula

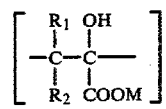

wherein $R_1$ and $R_2$ independently represent hydrogen or an alkyl group containing 1 to 3 carbon atoms and wherein M represents a cationic radical resulting from the dissociation of a base.

22. Adhesive composition according to claim 21, wherein the dispersing agent is a copolymer containing at least 65 mol % of units of the formula

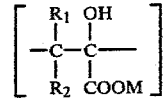

23. Adhesive composition according to claim 21, wherein the dispersing agent is a polymer which only contains units

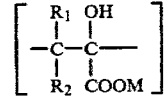

24. Adhesive composition according to claim 21, wherein the dispersing agent is an alkali metal salt or ammonium salt.

25. Adhesive composition according to claim 24, wherein the dispersing agent is a sodium salt.

26. Adhesive composition according to claim 21, wherein $R_1$ represents a hydrogen atom and $R_2$ is selected from the group consisting of hydrogen and the methyl group.

27. Adhesive composition according to claim 26 wherein the dispersing agent is sodium poly-alpha-hydroxyacrylate.

28. Adhesive composition according to claim 21, wherein the amount of dispersing agent employed is between 0.01 and 10% by weight relative to the particles to be dispersed.

29. Adhesive composition according to claim 21, wherein the dispersing agent has an average molecular weight greater than 300.

30. Adhesive composition according to claim 29, wherein the dispersing agent has an average molecular weight of between 2,000 and 10,000.

* * * * *